Feb. 12, 1946.        H. E. BURGERT ET AL        2,394,894
METHOD OF MOUNTING LENSES
Filed July 24, 1943

HAROLD E. BURGERT
JOHN V. BUTTERFIELD
INVENTORS
BY
ATTORNEYS

Patented Feb. 12, 1946

2,394,894

UNITED STATES PATENT OFFICE 2,394,894

METHOD OF MOUNTING LENSES

Harold E. Burgert, Brighton, and John V. Butterfield, Rochester, N. Y., assignors to Bausch & Lomb Optical Company, Rochester, N. Y., a corporation of New York Application July 24, 1943, Serial No. 496,058

1 Claim. (Cl. 88—57)

This invention relates to optical instruments, and more particularly to a method of mounting a lens in an optical instrument and the articles produced thereby.

In the now approved practice of mounting the lenses in optical instruments, thin flexible gaskets are used for resiliently mounting the lenses to minimize strain in the mounted lenses and to cushion the lenses against shock.

Considerable difficulty has been experienced in properly mounting these gaskets, particularly where the gaskets are mounted on narrow seats within an instrument. As the gaskets are necessarily thin, they are quite limp, and it is exceedingly difficult to handle the same. They will not hold their shape when handled, and even skilled workmen have difficulty in lowering the gasket into an instrument body and properly seating the same on the lens seat.

Furthermore, after the operator inserts the gasket within the tube and places it on the seat, care must be taken to insure that it will not be dislodged from the narrow seat before the lens is mounted thereon. The gasket may also be dislodged by the lens as it is positioned within the body of the instrument. It often happens that rotative movement of the lens, brought about when a locking element such as a ring is screwed into the body to secure the lens in position, will cause the gasket to buckle or otherwise become displaced.

This time-taking and cut and try placement of the gasket on the seat within this body, and its failure to remain in position, complicates an otherwise simple operation in the assembly of optical instruments.

The present invention has for its primary object the elimination of these difficulties by providing a method of mounting a lens in an optical instrument wherein at least one of the mounting surfaces of the lens or the lens-engaging surfaces of the mounting members are coated with a solution which, when dry, will form a thin resilient gasket adhering to the coated surface or surfaces.

The articles of the present invention, that is, the assembled elements with thin flexible gaskets adhering to the lens-engaging surfaces of the mounting members or to the mounting surfaces of the lens are as efficient as similar assemblies heretofore proposed and are more economical to manufacture.

It is obvious that the solution may be applied and the resultant gasket formed prior to the assembly for the coated lens or mounting-members may be stored until it is desired to assemble the same.

In the method of the present invention, it is only necessary for the operator to apply the solution, allow it to dry, and then without fear of the resulting gasket becoming dislodged, complete the assembly of the lens elements. Thus, the present invention permits a ready and easy method of resiliently mounting lenses in an optical instrument.

These and other objects and advantages reside in certain novel features of construction, arrangement and combination of parts and steps and processes as will hereinafter be more fully set forth and pointed out in the appended claim.

Referring to the drawing.

Figure 1:
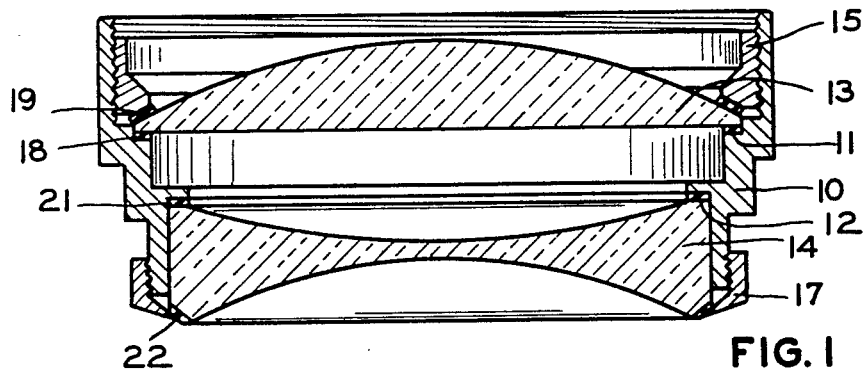
Fig. 1 is a vertical section of a photographic lens assembly embodying our invention.

In the embodiment shown in the drawing, we have illustrated our invention as being applied to a photographic lens mount wherein 10 designates a lens tube having two oppositely faced lens seats 11 and 12, the one for the plano-convex lens 13 of the system and the other for the double-concave lens 14.

The convex lens 13 is held to the seat 11 by the beveled edge of a retaining ring 15 bearing against the upper surface of the lens through the threaded engagement of the ring with the tube.

To hold the lens 14 against displacement on its seat 12, a retaining ring 17 is threaded onto the one end of the tube until an inturned flange formed integral with the ring is brought into engagement with the lens.

Heretofore, to minimize strain in the mounted lenses caused by their mounting members and also to cushion the lenses against shock, separate thin resilient gaskets have been used between the lens-engaging surfaces of the mounting members and the mounted lenses.

Although these gaskets were satisfactory in obtaining these results, it was difficult to properly mount the gaskets on the narrow lens seats within optical instruments. This difficulty was occasioned by the inherent qualities of the gaskets for the gaskets were necessarily thin, they were quite limp, and would not hold their shape when handled. It required considerable ingenuity to place the gaskets on the seat and even skilled workmen found it difficult to lower the gasket into an instrument body and properly place the gasket on the lens seat.

Also, after the gasket was properly seated on the lens seat, considerable care must be exercised to retain the gasket on the seat to prevent dislodgment before and during the placement of the lens thereon. It frequently occurs that the rotation of the lens, as the lens-retaining ring is screwed into the body to secure the lens in position, will cause the gasket to buckle or otherwise become displaced.

As can be seen, the placement of the gasket on the seat, and its failure to remain in position, has resulted in a vexatious and haphazard operation which has accordingly complicated the assembly of optical instruments.

The present invention obviates all of these difficulties in mounting a lens in an optical instrument, by a simple easy method in which at least one of the mounting surfaces of the lens or the lens-engaging surfaces of the mounting members is coated with a solution which, when dry, will form a thin resilient gasket adhering to the coated surface or surfaces.

Figure 2:
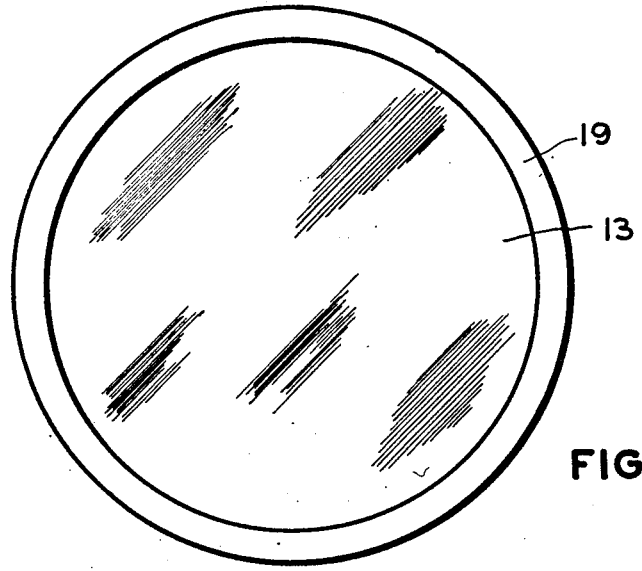
Fig. 2 is a top plan view of a coated lens.

In the preferred embodiment of the invention, the seat 11 is coated with a solution which, when dry, forms a thin flexible gasket 18 adhering to the seat 11. The plano surface of the lens 13 may then be readily seated upon the seat 11 without fear of the gasket 18 becoming dislodged. Prior to the insertion of the lens 13 on the seat 11, the mounting portion of the convex surface of the lens is coated with the solution which, when dry, will form a thin flexible gasket 19 adhering to the surface of the lens, as shown in Fig. 2. After the lens is placed on the seat, the retaining ring 15 is then screwed down to engage the coated surface of the lens to hold the same on the seat 11.

The lens 14 is similarly mounted in the tube 10 by coating the seat 12 and the portion of the lens 14 engaged by the flange of the ring 17 with the solution which, when dry, forms thin flexible gaskets 21 and 22 adhering to the seat 11 and the surface of the lens 14, respectively.

It is readily apparent that lenses may be prepared as finished assembly elements by coating at least one of their mounting surfaces with a solution which, when dry, will form a thin resilient film adhering to the coated surface, as shown in Fig. 2. These assembly elements may then be used in any lens mounting assembly, or they may be sold to the trade, or stored for future use or sale.

Although any solution may be used that will have these characteristic upon drying, we have found that a satisfactory gasket film having these properties can be made by the following formula:

Vinylite AYAA=20% (by weight).
Flexol 3GH=2% (by weight) of total solution, or 10% (by weight) of solid resin used.
Acetone=78% (by weight) of total solution.

"Vinylite AYAA" is the trade name of a synthetic resin and "Flexol 3GH" is the trade name of a plasticizing agent, both of these ingredients being sold by their respective trade-names. In preparation, the Vinylite AYAA and Flexol 3Gh are dissolved in acetone with thorough stirring and then filtered through medium filter paper or a four-layer mat of cheesecloth and then stored in air-tight containers.

This solution is applied to a surface to form a thin film on the surface varying between two-hundredth (.02) and four-hundredths (.04) of a millimeter. This film will dry to form a flexible solid gasket bonded to the coated surface.

Thus, the method of mounting a lens in an optical instrument of the present invention permits a ready and easy assembly of the lens with a mounting member of the optical instrument. The present invention also contemplates the formation of these gaskets upon the lens and the lens-engaging members previous to their assembly, thus permitting the production of these assembly elements as finished articles. Thus, the difficulties had in the prior tedious and haphazard methods of mounting a lens in an optical instrument are obviated by the utilization of the present invention at a substantial saving in the manufacturing costs of optical instruments.

From the foregoing, it will be apparent that we are able to attain the objects of our invention and provide a new method of mounting a lens in an optical instrument, together with the articles produced by the prefabrication of the assembly elements. The structural form shown and described merely illustrates our invention of mounting the lens in a photographic lens mounting assembly, and the prefabricated elements obtained thereby, and various modifications can be made without departing from the spirit of our invention or the scope of the appended claim.

We claim:

The method of mounting a lens in an optical device which comprises the steps of forming a thin resilient gasket between a lens surface and a surface of a mounting member by coating at least one of the surfaces with a solution which dries to form a thin resilient gasket, permitting the solution to dry and then securing the lens in the device with the gasket between the adjacent surfaces of the lens and mounting member.

HAROLD E. BURGERT.
JOHN V. BUTTERFIELD.